US010578453B2

United States Patent
Ryde et al.

(10) Patent No.: US 10,578,453 B2
(45) Date of Patent: Mar. 3, 2020

(54) RENDER-BASED TRAJECTORY PLANNING

(71) Applicant: Rosemount Aerospace Inc., Burnsville, MN (US)

(72) Inventors: Julian C. Ryde, Alameda, CA (US); Zohaib T. Mian, Natick, MA (US)

(73) Assignee: Rosemount Aerospace Inc., Burnsville, MN (US)

( * ) Notice: Subject to any disclaimer, the term of this patent is extended or adjusted under 35 U.S.C. 154(b) by 272 days.

(21) Appl. No.: 15/649,901

(22) Filed: Jul. 14, 2017

(65) Prior Publication Data

US 2019/0017838 A1   Jan. 17, 2019

(51) Int. Cl.
| | |
|---|---|
| B25J 9/16 | (2006.01) |
| G01C 21/36 | (2006.01) |
| G05D 1/10 | (2006.01) |
| G05D 1/02 | (2020.01) |
| G06T 17/05 | (2011.01) |

(52) U.S. Cl.
CPC ......... G01C 21/3638 (2013.01); G05D 1/10 (2013.01); *G05D 1/0221* (2013.01); *G06T 17/05* (2013.01)

(58) Field of Classification Search
USPC .......... 700/245–264; 701/300–302, 400–541
See application file for complete search history.

(56) References Cited

U.S. PATENT DOCUMENTS

| | | | |
|---|---|---|---|
| 9,525,862 B2* | 12/2016 | Benhimane | G06T 17/00 |
| 9,606,539 B1* | 3/2017 | Kentley | G01S 17/023 |
| 9,612,123 B1* | 4/2017 | Levinson | G01C 21/32 |
| 9,643,316 B2* | 5/2017 | Krasny | B25J 9/1666 |
| 10,029,372 B2* | 7/2018 | Tan | B25J 9/1697 |
| 10,268,191 B1* | 4/2019 | Lockwood | G05D 1/0022 |
| 2010/0253598 A1* | 10/2010 | Szczerba | G01S 13/723 345/7 |
| 2014/0015832 A1* | 1/2014 | Kozko | G06T 13/60 345/420 |
| 2015/0268058 A1* | 9/2015 | Samarasekera | G06K 9/00637 701/409 |
| 2015/0347682 A1* | 12/2015 | Chen | G16H 50/30 705/2 |

(Continued)

FOREIGN PATENT DOCUMENTS

WO   WO2016204740 A1   12/2016

OTHER PUBLICATIONS

Ryde, Julian and Ding, Xuchu (Dennis), Render Map: Exploiting the Link Between Perception and Rendering for Dense Mapping, Feb. 21, 2017, 8 pages.

(Continued)

*Primary Examiner* — Jonathan L Sample
(74) *Attorney, Agent, or Firm* — Kinney & Lange, P.A.

(57) ABSTRACT

A three-dimensional computer model of an environment is formed based on collected sensor data that includes at least one of image data of the environment and range data to objects in the environment. A plurality of candidate trajectories within the environment are generated based on the three-dimensional computer model. Rendered image data of the three-dimensional computer model and the plurality of candidate trajectories is formed. One of the candidate trajectories is selected based on the rendered image data and is utilized for controlling movement of a mobile platform.

20 Claims, 3 Drawing Sheets

(56) References Cited

U.S. PATENT DOCUMENTS

| | | | | |
|---|---|---|---|---|
| 2016/0023352 A1* | 1/2016 | Kennedy | ............... | B25J 9/06 |
| | | | | 700/259 |
| 2016/0167226 A1* | 6/2016 | Schnittman | ............ | B25J 5/00 |
| | | | | 382/153 |
| 2017/0039764 A1* | 2/2017 | Hu | ............ | G08G 5/0013 |
| 2017/0039859 A1* | 2/2017 | Hu | ............ | G09B 9/08 |
| 2017/0168488 A1* | 6/2017 | Wierzynski | ......... | G05D 1/0061 |
| 2017/0316115 A1* | 11/2017 | Lewis | ............ | G06T 7/12 |
| 2018/0232052 A1* | 8/2018 | Chizeck | ............ | G06T 17/00 |

OTHER PUBLICATIONS

Extended European Search Report for European Patent Application No. 18182539.9, dated Nov. 22, 2018, 8 pages.

\* cited by examiner

RENDER-BASED TRAJECTORY PLANNING

BACKGROUND

This disclosure relates generally to sensor data processing, and more particularly to sensor data processing for trajectory generation of a mobile platform.

Mobile platforms, such as ground-based vehicles, robots, aerial vehicles such as unmanned aerial vehicles (UAVs), drones, or other mobile platforms typically include sensors that provide environmental feedback for navigation and control of the mobile platform. Such sensors often include visual sensors (e.g., cameras) and range sensors that detect the existence of and/or distance to objects within the environment. Mobile platforms that operate autonomously or semi-autonomously often generate or store a map that facilitates obstacle avoidance, path planning, object recognition, or other navigational operations. Such maps, in certain cases, take the form of a rendered three-dimensional computer model, such as a polygon mesh model, which defines the shape and locations of objects within the environment.

Path planning and obstacle avoidance using a three-dimensional computer model, however, can be computationally expensive. As such, the utilization of three-dimensional computer models for additional degrees of available information as well as increased accuracy and precision of navigational control often increases the processing burden and corresponding power consumption of the navigation control system (e.g., when rendered on a CPU), thereby decreasing the utility of such models for real-time control of autonomous mobile platforms that often have strict power and weight requirements.

SUMMARY

In one example, a method includes collecting sensor data of an environment via one or more sensors disposed on a mobile platform. The sensor data includes at least one of visual image data of the environment and range data to objects in the environment. The method further includes generating a three-dimensional computer model of the environment based on the collected sensor data, generating a plurality of candidate trajectories within the environment based on the three-dimensional computer model, and forming rendered image data of the three-dimensional computer model and the plurality of candidate trajectories. The method further includes selecting one of the candidate trajectories as a selected trajectory based on the rendered image data, and controlling movement of the mobile platform based on the selected trajectory.

In another example, a system includes computer-readable memory, a central processing unit (CPU), and a graphics processing unit (GPU). The computer-readable memory stores a three-dimensional computer model of an environment. The CPU is configured to generate a plurality of candidate trajectories within the environment based on the three-dimensional computer model of the environment. The GPU is configured to form rendered image data of the three-dimensional computer model and the plurality of candidate trajectories. The CPU is further configured to select one of the candidate trajectories as a selected trajectory based on the rendered image data, and output the selected trajectory.

In another example, a system includes a mobile platform, a navigational control system disposed on the mobile platform, one or more sensors disposed on the mobile platform, computer-readable memory, a central processing unit (CPU), and a graphics processing unit (GPU). The navigational control system is configured to control movement of the mobile platform. The one or more sensors are configured to collect sensor data of an environment. The sensor data includes at least one of visual image data of the environment and range data to objects in the environment. The computer-readable memory stores a three-dimensional computer model of the environment generated based on the collected sensor data. The CPU is configured to generate a plurality of candidate trajectories within the environment based on the three-dimensional computer model of the environment. The GPU is configured to form rendered image data of the three-dimensional computer model and the plurality of candidate trajectories. The CPU is further configured to select one of the candidate trajectories as a selected trajectory based on the rendered image data and output the selected trajectory to the navigational control system.

DETAILED DESCRIPTION

A system implementing techniques of this disclosure utilizes the advantages of a graphics processing unit (GPU) including embedded graphics processing algorithms and corresponding increased graphical processing speed of a graphics processing unit (GPU) to decrease the processing burden on a central processing unit (CPU) for trajectory planning and motion control of a mobile platform using a three-dimensional computer model of an environment. Rather than require computationally expensive trajectory and collision avoidance planning using a three-dimensional computer model of an environment (e.g., a polygon mesh model), a system implementing techniques described herein leverages the embedded graphics processing algorithms and corresponding processing efficiency of a GPU to form rendered image data of the three-dimensional computer model including multiple candidate trajectories of the mobile platform. The rendered image data, rather than the three-dimensional computer model, is processed (e.g., by the CPU or GPU) for obstacle collision detections and selection of one of the candidate trajectories for motion control of the mobile platform. As such, a system implementing techniques of this disclosure can decrease a processing burden on the CPU while increasing an overall processing speed of the system for trajectory planning of the mobile platform.

Figure 1:
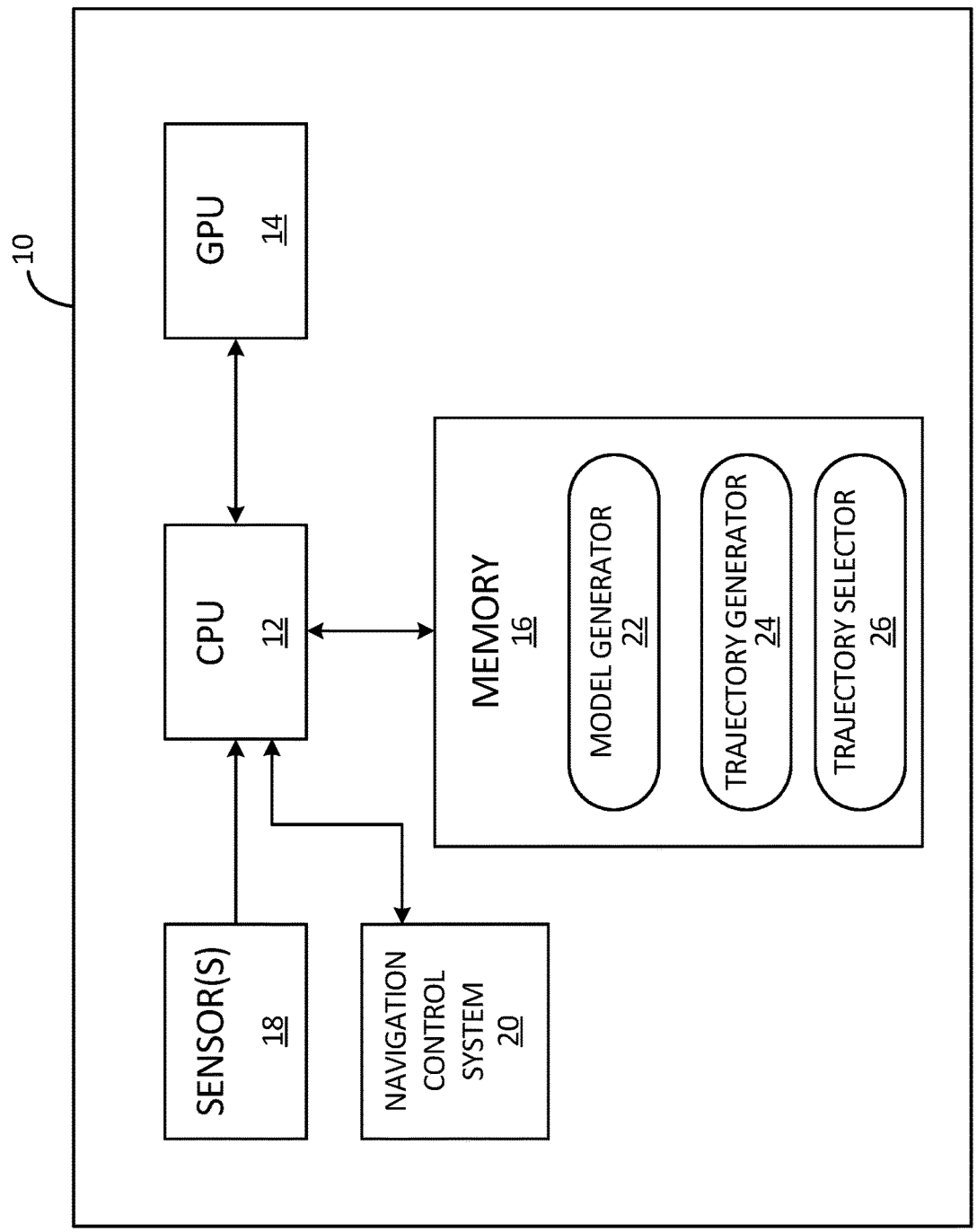
FIG. 1 is block diagram of an example mobile platform including a central processing unit (CPU) that selects one of plurality of candidate trajectories based on rendered image data formed by a graphics processing unit (GPU).

FIG. 1 is a block diagram of mobile platform 10 including central processing unit (CPU) 12 that selects one of a plurality of candidate trajectories based on rendered image data formed by graphics processing unit (GPU) 14. As illustrated in FIG. 1, mobile platform 10 further includes computer-readable memory 16, one or more sensors 18, and navigation control system 20. Computer-readable memory 16 includes model generator 22, trajectory generator 24, and trajectory selector 26.

Mobile platform 10 can be, e.g., a land or water-based vehicle or robot, an aerial vehicle such as an unmanned aerial vehicle (UAV), or other mobile platform. Navigation control system 20 is disposed on mobile platform 10 to control movement of mobile platform 10, such as according to a selected trajectory received from CPU 12. Navigation control system 20 can include propulsion subsystems, steering or other motion control subsystems, navigation tracking subsystems (e.g., inertial measurement units, attitude heading reference systems, etc.), or other components and/or subsystems for controlling movement of mobile platform 10.

Sensor(s) 18 include one or more sensors that collect sensor data of an environment of mobile platform 10 and provide the collected sensor data to CPU 12 for use in three-dimensional computer model generation, candidate trajectory generation, and trajectory selection, as is further described below. Examples of sensor(s) 18 include any one or more of an image sensor (e.g., a camera), a range sensor such as a light detection and ranging (LiDAR) sensor, or combinations thereof. For instance, in some examples, sensor(s) 18 include a red, green, blue, and distance (RGBD) sensor or other similar sensor that produces depth (or range) data superimposed on a colored visual image. In general, sensor(s) 18 include any one or more sensors that can provide visual image data of an environment, range data to objects in the environment, or both.

CPU 12 includes processing circuitry configured to execute computer-readable instructions stored at, e.g., memory 16, which when executed causes CPU 12 to operate in accordance with techniques described herein. Examples of CPU 12 include any one or more of a microprocessor, a digital signal processor (DSP), an application specific integrated circuit (ASIC), a field-programmable gate array (FPGA), or other equivalent discrete or integrated logic circuitry. Computer-readable memory 16 stores information and program instructions for execution by CPU 12. Computer-readable memory 16, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory 16 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable (EEPROM) memories.

GPU 14 includes processing circuitry designed to efficiently manage and manipulate memory to accelerate the formation of image data. GPU 14 includes dedicated embedded circuitry for executing algorithms that are optimized for creating and manipulating image data, such as three-dimensional graphics algorithms including, e.g., texture mapping and image rendering, geometric rotations and translations, anti-aliasing operations such as oversampling and interpolation, and other image data creation and manipulation operations. GPU 14, as described herein, implements embedded algorithms for efficiently forming rendered image data from a three-dimensional computer model of an environment. Such rendered image data can include a two-dimensional image of a scene of an environment defined by the three-dimensional computer model as viewed from a specified viewpoint (often referred to as a virtual camera location). In addition, the rendered image data can include a Z-buffer that specifies image depth of pixels of the rendered image data corresponding to a range (or distance) of the portion of the rendered image represented by the pixel from the viewpoint location. For instance, a Z-buffer can be represented as a two-dimensional matrix, each element of the matrix corresponding uniquely to one pixel of the rendered image data. Accordingly, Z-buffer values associated with rendered image data specify a range (or depth) of the corresponding pixel in the two-dimensional image to enable three-dimensional analysis of the rendered image data.

While illustrated as including computer-readable memory 16 operatively coupled with (or integral to) CPU 12, it should be understood that GPU 14 can include computer-readable memory that is substantially similar to computer-readable memory 16. That is, GPU 14 can also include computer-readable memory that stores program instructions and/or data for use by GPU 14 during operation, such as for memory management and manipulation during execution of graphical algorithms to form rendered image data from a three-dimensional computer model of an environment. In certain examples, GPU 14 can store the three-dimensional computer model of the environment at computer-readable memory of GPU 14 for use by GPU 14 during operation. For instance, CPU 12 can provide (e.g., load) the three-dimensional computer model stored at computer-readable memory 16 to GPU 14 for use during execution. In other examples, CPU 12 and GPU 14 can access shared memory, such as computer-readable memory 16.

As is further described below, CPU 12 receives sensor data collected by sensor(s) 18 including at least one of visual image data of the environment and range data to objects in the environment. CPU 12 executes model generator 22 and trajectory generator 24 to generate a three-dimensional computer model of the environment based on the collected sensor data (e.g., via model generator 22) and to generate a plurality of candidate trajectories (i.e., two or more candidate trajectories) within the environment based on the three-dimensional computer model (e.g., via trajectory generator 24). CPU 12 provides control commands (e.g., electrical and/or communicative commands) to GPU 14 configured to cause GPU 14 to form rendered image data of the three-dimensional computer model and the plurality of candidate trajectories. In some examples, as is further described below, CPU 12 and GPU 14 operate in combination to form the three-dimensional computer model (e.g., a three-dimensional polygon mesh model) of the environment based on the collected sensor data from sensor(s) 18 and rendered image data formed by GPU 14 from the three-dimensional computer model. For instance, CPU 12 can utilize rendered image data of the environment received from GPU 14 to update (i.e., modify) the three-dimensional computer model of the environment based on comparison and alignment operations of the three-dimensional computer model and the rendered image data.

CPU 12 receives the rendered image data (e.g., in the form of a rendered image model) of the environment including the plurality of candidate trajectories from GPU 14. That is, the rendered image data includes, e.g., a two-dimensional image of both the scene of the environment and the plurality of candidate trajectories through the environment. Trajectory selector 26, executing on CPU 12 (or, in certain examples, GPU 14 acting as a general purpose GPU), processes the rendered image data to identify predicted collisions between the candidate trajectories and objects within the environment (e.g., intersections of the candidate trajectories in the rendered image data with environmental objects represented in the rendered image data), as is further described below. Trajectory selector 26 selects one of the candidate trajectories as a selected trajectory for controlled movement of mobile platform 10 and outputs the selected trajectory to navigation control system 20. Navigation control system 20 controls movement of mobile platform 10 based on the selected trajectory.

Accordingly, rather than require simulation of each of the plurality of candidate trajectories (e.g., in serial) through the three-dimensional computer model of the environment and assessing each possible state space configuration of the mobile platform to identify potential collisions and satisfaction of other predefined trajectory criteria (e.g., route length, destination, or other criteria), a system implementing techniques of this disclosure can utilize the efficient rendering of image data via GPU 14 including multiple candidate trajectories (e.g., in parallel) for trajectory selection. As such, techniques of this disclosure can decrease a processing burden (i.e., a required processing bandwidth) of CPU 12 and increase an overall processing speed of the system to select a trajectory for controlled movement of mobile platform 10 using a three-dimensional model of the environment.

Figure 2:
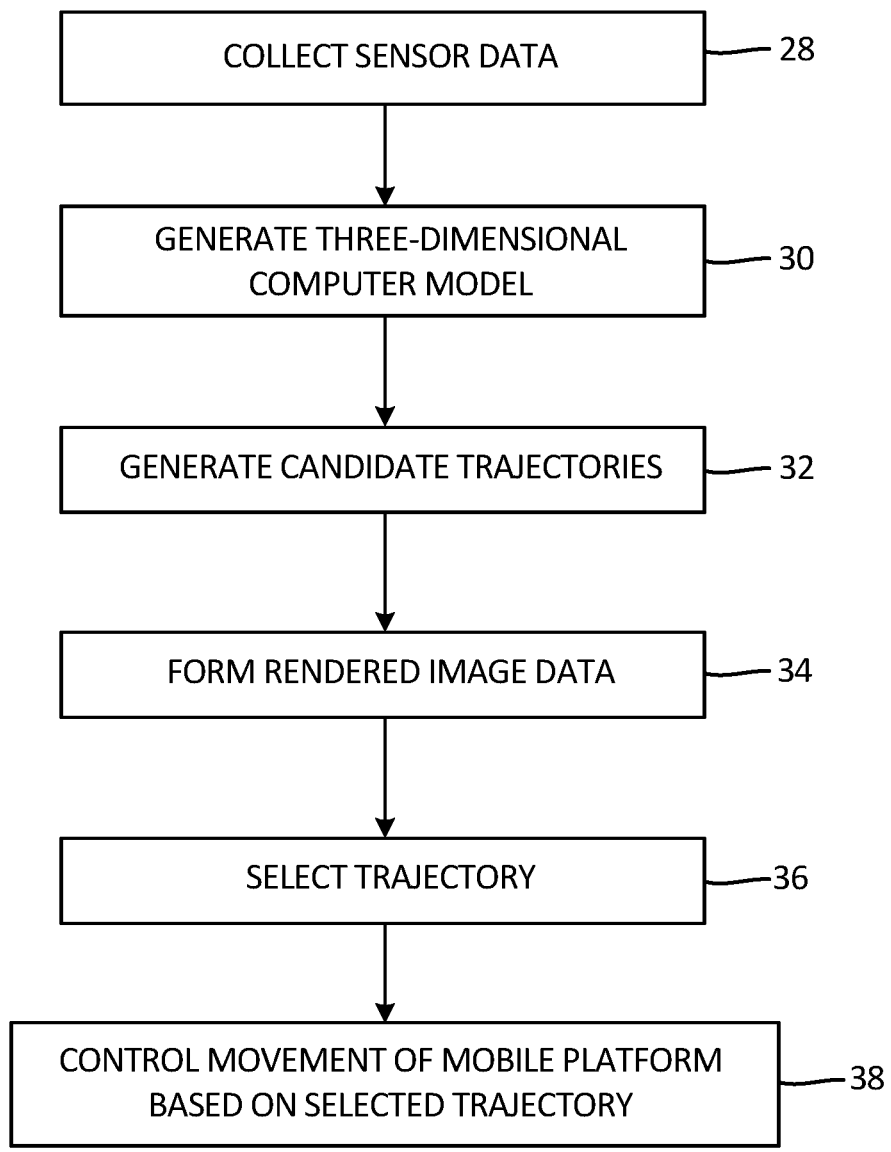
FIG. 2 is a flow diagram illustrating example operations to select a trajectory for a mobile platform based on rendered image data of a three-dimensional computer model of an environment and a plurality of candidate trajectories.

FIG. 2 is a flow diagram illustrating example operations to select a trajectory for a mobile platform based on rendered image data of a three-dimensional computer model of an environment and a plurality of candidate trajectories. For purposes of clarity and ease of discussion, the example operations of FIG. 2 are described below within the context of mobile platform 10 of FIG. 1.

As illustrated in FIG. 2, sensor data of an environment is collected (Step 28). For example, sensor data including at least one of visual image data of an environment and range data to objects in the environment can be collected by sensor(s) 18 disposed on mobile platform 10.

A three-dimensional computer model of the environment is generated based on the collected sensor data (Step 30). As an example, model generator 22, executing on CPU 12, can generate a three-dimensional polygon mesh model of the environment based on the sensor data received from sensor(s) 18. In some examples, model generator 22 can utilize image data rendered by GPU 14 from the three-dimensional computer model to update (e.g., modify) the model based on comparison and alignment operations of the three-dimensional computer model with the rendered image data. For instance, model generator 22 can use an iterative closest point (ICP) algorithm to minimize a difference between locations of vertices and edges corresponding to objects within a polygon mesh model of the environment and corresponding objects within the rendered image data.

In some examples, model generator 22 can encode the three-dimensional computer model of the environment with indications of categorized regions of the three-dimensional model. For instance, model generator 22 can categorize regions of the three-dimensional computer model as corresponding to one of an occupied space category, a free space category, and an unknown space category. The occupied space category is associated with objects in the environment (i.e., regions of the three-dimensional model associated with space occupied by objects in the environment). The free space category is associated with volumes between objects in the environment (i.e., regions of the three-dimensional model associated with space that is not occupied by objects in the environment). The unknown space category is associated with volumes that are not categorized in either the occupied space category or the free space category. For instance, regions beyond a range of sensor(s) 18 can be associated with the unknown space category. Similarly, regions that are obstructed from view of sensor(s) 18 (e.g., behind occupied spaces or otherwise out of view of sensor(s) 18) can be associated with the unknown space category.

Model generator 22 can encode the three-dimensional model with indications of the categorized regions, such as by assigning a unique color, alphanumeric code, or other unique indication of the corresponding category to the identified regions of the three-dimensional model. In certain examples, rather than encode entire regions within the three-dimensional model, model generator 22 encodes interfaces between region categories. For instance, model generator 22 can encode interfaces between regions associated with the occupied space category and regions associated with the free space category with a first unique identifier (e.g., a first unique color), interfaces between regions associated with the occupied space category and regions associated with the free space category with a second unique identifier (e.g., a second unique color), and interfaces between regions associated with the free space category and regions associated with the unknown space category with a third unique identifier (e.g., a third unique color). Categorization and encoding of regions into one of the occupied space category, the free space category, and the unknown space category can facilitate trajectory planning and selection, such as to satisfy defined mission criteria of mobile platform 10, as is further described below.

A plurality of candidate trajectories of mobile platform 10 within the environment are generated based on the three-dimensional computer model (Step 32). For example, trajectory generator 24 can generate a plurality of candidate trajectories (e.g., two or more candidate trajectories) of mobile platform 10 through the environment using the three-dimensional model of the environment. In some examples, trajectory generator 24 can utilize a physics-based model of mobile platform 10 that simulates a dynamic response and movement of mobile platform 10 through the environment to generate the plurality of trajectories. Trajectory generator 24, in certain examples, implements a trajectory smoothing algorithm that removes high-frequency components of the candidate trajectories to satisfy motion constraints of mobile platform 10 defined by, e.g., a physics-based model of mobile platform 10 (e.g., to remove sharp turns or other physically-unfeasible maneuvers of mobile platform 10 from the respective trajectory).

In some examples, trajectory generator 24 can generate the plurality of candidate trajectories based on defined mission criteria of mobile platform 10. For instance, defined mission criteria can include exploration criteria, shortest collision-free path criteria, or other mission criteria. As an example, in response to determining that defined mission criteria of mobile platform 10 include exploration criteria, trajectory generator 24 can generate the plurality of candidate trajectories to terminate in a region of the three-dimensional model associated with the unknown space category. As such, trajectory generator 24 can help to ensure that mobile platform 10 satisfies the exploration criteria by moving toward unknown regions of the environment to gather sensor data (e.g., via sensor(s) 18) of the unknown regions. As another example, in response to determining that defined mission criteria of mobile platform 10 include shortest collision-free path criteria, trajectory generator 24 can generate the plurality of candidate trajectories through and terminating in regions of the three-dimensional computer model associated with the free space category. Accordingly, trajectory generator 24 can utilize the categorized regions encoded in the three-dimensional computer model of the environment to generate candidate trajectories that satisfy defined mission criteria of mobile platform 10.

Rendered image data of the three-dimensional computer model and the plurality of candidate trajectories is formed (Step 34). For example, CPU 12 can provide control commands to GPU 14 to cause GPU 14 to form rendered image data of the three-dimensional model and the plurality of candidate trajectories from a defined viewpoint corresponding to a location of mobile platform 10 within the three-dimensional model of the environment. GPU 14 forms the rendered image data, including the plurality of candidate trajectories, and provides the rendered image data to CPU 12.

One of the candidate trajectories is selected as a selected trajectory based on the rendered image data (Step 36). For example, trajectory selector 26 can process the rendered image data to identify, for each of the plurality of candidate trajectories, whether the respective trajectory intersects any one or more objects in the environment (i.e., corresponding to a predicted collision of mobile platform 10 with the one or more objects when traveling along the candidate trajectory). Trajectory selector 26 can reject candidate trajectories that are identified as intersecting objects in the environment. As an example, trajectory selector 26 can identify intersections of a candidate trajectory with objects in the environment based on a comparison of Z-buffer values of the rendered image data corresponding to pixels of the candidate trajectory within the rendered image data with Z-buffer values of the rendered image data corresponding to pixels at or near (e.g., within a threshold distance from) the pixels of the candidate trajectory. A difference in Z-buffer values between the candidate trajectory and surrounding pixels that is less than (or equal to) a threshold value indicate an intersection of the candidate trajectory with objects within the environment. In contrast, a difference in Z-buffer values between the candidate trajectory and surrounding pixels that is greater than the threshold value indicates that the candidate trajectory does not intersect with objects within the environment. The threshold value (i.e., relating to a distance between the candidate trajectory and the object represented by the pixel) and/or an area of surrounding pixels utilized for the comparison can be based on a shape, volume, and/or configuration (e.g., orientation) of mobile platform 10, thereby enabling trajectory selector 26 to predict potential collisions between any portion of mobile platform 10 and objects within the environment.

In some examples, trajectory selector 26 determines which of the plurality of candidate trajectories is most likely to be collision-free (i.e., not intersecting objects in the environment) as the one of the plurality of candidate trajectories having the greatest number of consecutive pixels. For instance, trajectory selector 26 can identify a number of consecutive pixels in the rendered image data associated with each of the candidate trajectories, and can select the one of the candidate trajectories having the greatest number of consecutive pixels.

In certain examples, trajectory selector 26 selects one of the candidate trajectories as a selected trajectory for controlled movement of mobile platform 10 based on defined mission criteria of mobile platform 10. For instance, in examples where the defined mission criteria include shortest collision-free path criteria, trajectory selector 26 can select the one of the plurality of candidate trajectories that do not intersect objects within the environment associated with the least number of pixels within the rendered image data. In general, trajectory selector 26 can select one of the plurality of candidate trajectories that does not intersect objects within the environment and satisfies defined mission criteria of mobile platform 10.

Movement of mobile platform 10 is controlled based on the selected trajectory (Step 38). For instance, trajectory selector 26 can output the selected trajectory to navigation control system 20. Navigation control system 20 controls operation of propulsion, steering, and/or other navigational subsystems to control movement of mobile platform 10 according to the selected trajectory.

It should be understood that the example operations of FIG. 2 can be iteratively performed to enable continuous autonomous trajectory planning and controlled movement of mobile platform 10. For instance, the example operations can be iteratively performed at repeated time intervals, at repeated travel distances of mobile platform 10, or other iterative criteria to enable repeated selection of trajectories and the corresponding controlled movement of mobile platform 10.

Figure 3:
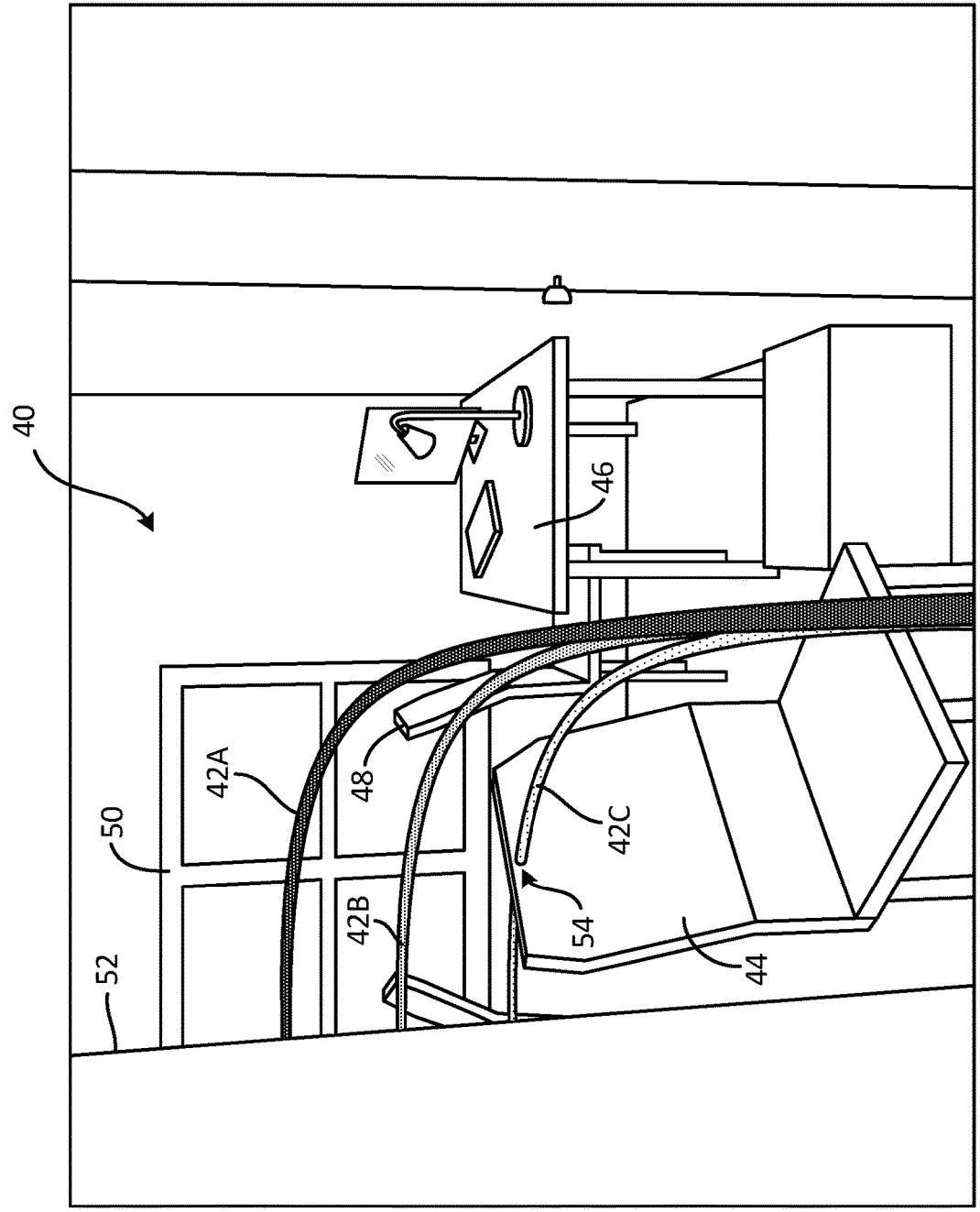
FIG. 3 illustrates an example of rendered image data of a three-dimensional computer model of an environment and a plurality of candidate trajectories.

FIG. 3 illustrates example rendered image data 40 of a three-dimensional computer model of an environment and a plurality of candidate trajectories 42A, 42B, and 42C. That is, rendered image data 40 is an example of rendered image data formed by GPU 14 of a three-dimensional model of an environment generated based on sensor data collected by sensor(s) 18 of mobile platform 10. In the example of FIG. 3, rendered image data 40 includes three candidate trajectories 42A, 42B, and 42C, though in other examples, rendered image data 40 can include more or fewer than three candidate trajectories.

As illustrated in FIG. 3, rendered image data 40 includes image data corresponding to various objects within the environment, including, among others, chair 44, desk 46, chair 48, windows 50, and wall 52. In the example of FIG. 3, candidate trajectory 42C intersects chair 44 at region 54. Candidate trajectories 42A and 42B, in this example, are collision-free trajectories (i.e., do not intersect objects within the environment). Trajectory selector 26 can identify the intersection of candidate trajectory 42C with chair 44 in the environment based on a determination that Z-buffer values of trajectory 42C at region 54 differ from Z-buffer values of rendered image data 40 surrounding region 54 and defining chair 44 by less than a threshold amount. Accordingly, trajectory selector 26 can identify candidate trajectory 42C as associated with a predicted collision between mobile platform 10 and chair 44 at region 54. Trajectory selector 26, in this example, can reject trajectory 42C and refrain from selecting trajectory 42C as the selected trajectory for controlled movement of mobile platform 10.

Trajectory selector 26 can identify that each of trajectories 42A and 42B do not intersect objects within the environment based on a determination that Z-buffer values of each of trajectories 42A and 42B differ from Z-buffer values of rendered image data 40 surrounding trajectories 42A and 42B by greater than the threshold amount. That is, though trajectories 42A and 42B may appear, from a two-dimensional rendering of the environment, to intersect chair 44, chair 48, windows 50, and wall 52, trajectory selector 26 can identify, based on Z-buffer values of each of trajectory 42A and trajectory 42B, that trajectories 42A and 42B pass above chair 44, in front of chair 48, and terminate behind wall 52 (e.g., into an unknown category of space).

Trajectory selector 26 can select one of trajectories 42A and 42B as the selected trajectory for controlled movement of mobile platform 10. Trajectory selector 26 can identify which of trajectories 42A and 42B is selected based on, e.g., mission criteria of mobile platform 10. For instance, trajectory selector 26 can identify that trajectory 42A is associated with fewer pixels in rendered image data 40 than trajectory 42B, and can select trajectory 42A as the selected trajectory for controlled movement of mobile platform 10 in examples where mission criteria of mobile platform 10 include shortest collision-free path criteria.

Accordingly, a system implementing techniques of this disclosure can utilize the efficient rendering of image data via GPU 14 for trajectory selection and controlled movement of mobile platform 10. The techniques can increase overall processing speed of the system during trajectory selection while decreasing a processing burden on CPU 12.

Discussion of Possible Embodiments

The following are non-exclusive descriptions of possible embodiments of the present invention.

A method includes collecting sensor data of an environment via one or more sensors disposed on a mobile platform. The sensor data includes at least one of visual image data of the environment and range data to objects in the environment. The method further includes generating a three-dimensional computer model of the environment based on the collected sensor data, generating a plurality of candidate trajectories within the environment based on the three-dimensional computer model, and forming rendered image data of the three-dimensional computer model and the plurality of candidate trajectories. The method further includes selecting one of the candidate trajectories as a selected trajectory based on the rendered image data, and controlling movement of the mobile platform based on the selected trajectory.

The method of the preceding paragraph can optionally include, additionally and/or alternatively, any one or more of the following features, configurations, operations, and/or additional components:

Selecting the one of the candidate trajectories as the selected trajectory based on the rendered image data can include identifying, using the rendered image data, that the selected trajectory does not intersect the objects in the environment.

The rendered image data can include a Z-buffer having depth values associated with pixels of the rendered image data and corresponding to the range data to the objects in the environment. Identifying that the selected trajectory does not interest the objects in the environment can include identifying that Z-buffer values associated with pixels of the selected trajectory in the rendered image data differ by a threshold amount from Z-buffer values associated with pixels of the objects in the environment.

Selecting the one of the candidate trajectories as the selected trajectory based on the rendered image data can include: identifying a number of consecutive pixels in the rendered image data associated with each of the candidate trajectories; and selecting the one of the candidate trajectories associated with the greatest number of consecutive pixels as the selected trajectory.

Generating the three-dimensional computer model of the environment can include categorizing regions of the three-dimensional computer model as corresponding to one of an occupied space category associated with the objects in the environment, a free space category associated with volumes between the objects in the environment, and an unknown space category associated with volumes that are not included in either of the occupied space category or the free space category.

Generating the three-dimensional computer model of the environment can include encoding the three-dimensional computer model with indications of the categorized regions.

Encoding the three-dimensional computer model can include assigning a unique color to each category of the categorized regions.

Generating the three-dimensional computer model of the environment can include encoding the three-dimensional computer model with indications of interfaces between the categorized regions.

Generating the plurality of candidate trajectories within the environment based on the three-dimensional computer model can include: identifying a target category of the categorized regions; selecting a destination within one of the categorized regions of the three-dimensional computer model corresponding to the target category; and generating each of the plurality of candidate trajectories to terminate at the destination.

Identifying the target category of the categorized regions can include identifying the target category according to defined mission criteria of the mobile platform.

The defined mission of the mobile platform can include exploration criteria. Identifying the target category of the categorized regions can include identifying the target category as the unknown space category.

A system includes computer-readable memory, a central processing unit (CPU), and a graphics processing unit (GPU). The computer-readable memory stores a three-dimensional computer model of an environment. The CPU is configured to generate a plurality of candidate trajectories within the environment based on the three-dimensional computer model of the environment. The GPU is configured to form rendered image data of the three-dimensional computer model and the plurality of candidate trajectories. The CPU is further configured to select one of the candidate trajectories as a selected trajectory based on the rendered image data, and output the selected trajectory.

The system of the preceding paragraph can optionally include, additionally and/or alternatively, any one or more of the following features, configurations, operations, and/or additional components:

The CPU can be configured to select the one of the candidate trajectories as the selected trajectory by identifying, using the rendered image data, that the selected trajectory does not intersect objects in the environment.

The GPU can be configured to form the rendered image data to include a Z-buffer having depth values associated with pixels of the rendered image data and corresponding to range data to objects in the environment. The CPU can be configured to identify that the selected trajectory does not intersect the objects in the environment by identifying that Z-buffer values associated with pixels of the selected trajectory in the rendered image data differ by a threshold amount from Z-buffer values associated with pixels of the objects in the environment.

The CPU can be configured to select the one of the candidate trajectories as the selected trajectory based on the rendered image data by: identifying a number of consecutive pixels in the rendered image data associated with each of the candidate trajectories; and selecting the one of the candidate trajectories associated with the greatest number of consecutive pixels as the selected trajectory.

A system includes a mobile platform, a navigational control system disposed on the mobile platform, one or more sensors disposed on the mobile platform, computer-readable memory, a central processing unit (CPU), and a graphics processing unit (GPU). The navigational control system is configured to control movement of the mobile platform. The one or more sensors are configured to collect sensor data of an environment. The sensor data includes at least one of visual image data of the environment and range data to objects in the environment. The computer-readable memory stores a three-dimensional computer model of the environment generated based on the collected sensor data. The CPU is configured to generate a plurality of candidate trajectories within the environment based on the three-dimensional computer model of the environment. The GPU is configured to form rendered image data of the three-dimensional computer model and the plurality of candidate trajectories. The CPU is further configured to select one of the candidate trajectories as a selected trajectory based on the rendered image data and output the selected trajectory to the navigational control system.

The system of the preceding paragraph can optionally include, additionally and/or alternatively, any one or more of the following features, configurations, operations, and/or additional components:

The one or more sensors can include a red, green, blue, and distance (RGBD) sensor configured to collect both the visual image data of the environment and the range data to the objects in the environment.

The one or more sensors can include: an image sensor configured to collect the visual image data of the environment; and a light detection and ranging (LiDAR) sensor configured to collect the range data to the objects in the environment.

The mobile platform can include an unmanned aerial vehicle (UAV).

The CPU can be configured to select the one of the candidate trajectories as the selected trajectory based on the rendered image data by identifying, using the rendered image data, that the selected trajectory does not intersect objects in the environment.

The GPU can be configured to form the rendered image data to include a Z-buffer having depth values associated with pixels of the rendered image data and corresponding to range data to the objects in the environment. The CPU can be configured to identify that the selected trajectory does not interest the objects in the environment by identifying that Z-buffer values associated with pixels of the selected trajectory in the rendered image data differ by a threshold amount from Z-buffer values associated with pixels of the objects in the environment.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
collecting sensor data of an environment via one or more sensors disposed on a mobile platform, the sensor data including at least one of visual image data of the environment and range data to objects in the environment;
generating a three-dimensional computer model of the environment based on the collected sensor data;
generating a plurality of candidate trajectories within the environment based on the three-dimensional computer model;
forming rendered image data of the three-dimensional computer model and the plurality of candidate trajectories, wherein the rendered image data includes a two-dimensional image of the environment and the plurality of candidate trajectories within the environment;
selecting one of the candidate trajectories as a selected trajectory based on the rendered image data; and
controlling movement of the mobile platform based on the selected trajectory.

2. The method of claim 1,
wherein selecting the one of the candidate trajectories as the selected trajectory based on the rendered image data comprises identifying, using the rendered image data, that the selected trajectory does not intersect the objects in the environment.

3. The method of claim 2,
wherein the rendered image data includes a Z-buffer having depth values associated with pixels of the rendered image data and corresponding to the range data to the objects in the environment; and
wherein identifying that the selected trajectory does not interest the objects in the environment comprises identifying that Z-buffer values associated with pixels of the selected trajectory in the rendered image data differ by a threshold amount from Z-buffer values associated with pixels of the objects in the environment.

4. The method of claim 1,
wherein selecting the one of the candidate trajectories as the selected trajectory based on the rendered image data comprises:
identifying a number of consecutive pixels in the rendered image data associated with each of the candidate trajectories; and
selecting the one of the candidate trajectories associated with the greatest number of consecutive pixels as the selected trajectory.

5. The method of claim 1,
wherein generating the three-dimensional computer model of the environment comprises categorizing regions of the three-dimensional computer model as corresponding to one of an occupied space category associated with the objects in the environment, a free space category associated with volumes between the objects in the environment, and an unknown space category associated with volumes that are not included in either of the occupied space category or the free space category.

6. The method of claim 5,
wherein generating the three-dimensional computer model of the environment comprises encoding the three-dimensional computer model with indications of the categorized regions.

7. The method of claim 6,
wherein encoding the three-dimensional computer model comprises assigning a unique color to each category of the categorized regions.

8. The method of claim 5,
wherein generating the three-dimensional computer model of the environment comprises encoding the three-dimensional computer model with indications of interfaces between the categorized regions.

9. The method of claim 5,
wherein generating the plurality of candidate trajectories within the environment based on the three-dimensional computer model comprises:
identifying a target category of the categorized regions;
selecting a destination within one of the categorized regions of the three-dimensional computer model corresponding to the target category; and
generating each of the plurality of candidate trajectories to terminate at the destination.

10. The method of claim 9,
wherein identifying the target category of the categorized regions comprises identifying the target category according to defined mission criteria of the mobile platform.

11. The method of claim 10,
wherein the defined mission criteria of the mobile platform include exploration criteria; and
wherein identifying the target category of the categorized regions comprises identifying the target category as the unknown space category.

12. A system comprising:
computer-readable memory storing a three-dimensional computer model of an environment;
a central processing unit (CPU) configured to generate a plurality of candidate trajectories within the environment based on the three-dimensional computer model of the environment; and
a graphics processing unit (GPU) configured to form rendered image data of the three-dimensional computer model and the plurality of candidate trajectories, wherein the rendered image data includes a two-dimensional image of the environment and the plurality of candidate trajectories within the environment;
wherein the CPU is further configured to:
select one of the candidate trajectories as a selected trajectory based on the rendered image data; and
output the selected trajectory.

13. The system of claim 12,
wherein the CPU is configured to select the one of the candidate trajectories as the selected trajectory by identifying, using the rendered image data, that the selected trajectory does not intersect objects in the environment.

14. The system of claim 13,
wherein the GPU is configured to form the rendered image data to include a Z-buffer having depth values associated with pixels of the rendered image data and corresponding to range data to objects in the environment; and
wherein the CPU is configured to identify that the selected trajectory does not intersect the objects in the environment by identifying that Z-buffer values associated with pixels of the selected trajectory in the rendered image data differ by a threshold amount from Z-buffer values associated with pixels of the objects in the environment.

15. The system of claim 12,
wherein the CPU is configured to select the one of the candidate trajectories as the selected trajectory based on the rendered image data by:
identifying a number of consecutive pixels in the rendered image data associated with each of the candidate trajectories; and
selecting the one of the candidate trajectories associated with the greatest number of consecutive pixels as the selected trajectory.

16. A system comprising:
a mobile platform;
a navigational control system disposed on the mobile platform and configured to control movement of the mobile platform;
one or more sensors disposed on the mobile platform and configured to collect sensor data of an environment, the sensor data including at least one of visual image data of the environment and range data to objects in the environment;
computer-readable memory storing a three-dimensional computer model of the environment generated based on the collected sensor data;
a central processing unit (CPU) configured to generate a plurality of candidate trajectories within the environment based on the three-dimensional computer model of the environment; and
a graphics processing unit (GPU) configured to form rendered image data of the three-dimensional computer model and the plurality of candidate trajectories, wherein the rendered image data includes a two-dimensional image of the environment and the plurality of candidate trajectories within the environment;
wherein the CPU is further configured to select one of the candidate trajectories as a selected trajectory based on the rendered image data and output the selected trajectory to the navigational control system.

17. The system of claim 16,
wherein the one or more sensors comprise a red, green, blue, and distance (RGBD) sensor configured to collect both the visual image data of the environment and the range data to the objects in the environment.

18. The system of claim 16,
wherein the one or more sensors comprise:
an image sensor configured to collect the visual image data of the environment; and
a light detection and ranging (LiDAR) sensor configured to collect the range data to the objects in the environment.

19. The system of claim 16,
wherein the CPU is configured to select the one of the candidate trajectories as the selected trajectory based on the rendered image data by identifying, using the rendered image data, that the selected trajectory does not intersect objects in the environment.

20. The system of claim 19,
wherein the GPU is configured to form the rendered image data to include a Z-buffer having depth values associated with pixels of the rendered image data and corresponding to range data to the objects in the environment; and
wherein the CPU is configured to identify that the selected trajectory does not interest the objects in the environment by identifying that Z-buffer values associated with pixels of the selected trajectory in the rendered image data differ by a threshold amount from Z-buffer values associated with pixels of the objects in the environment.

* * * * *